July 19, 1938.  J. OBERLE  2,123,955
ANIMAL SNARE TRAP
Filed April 9, 1935
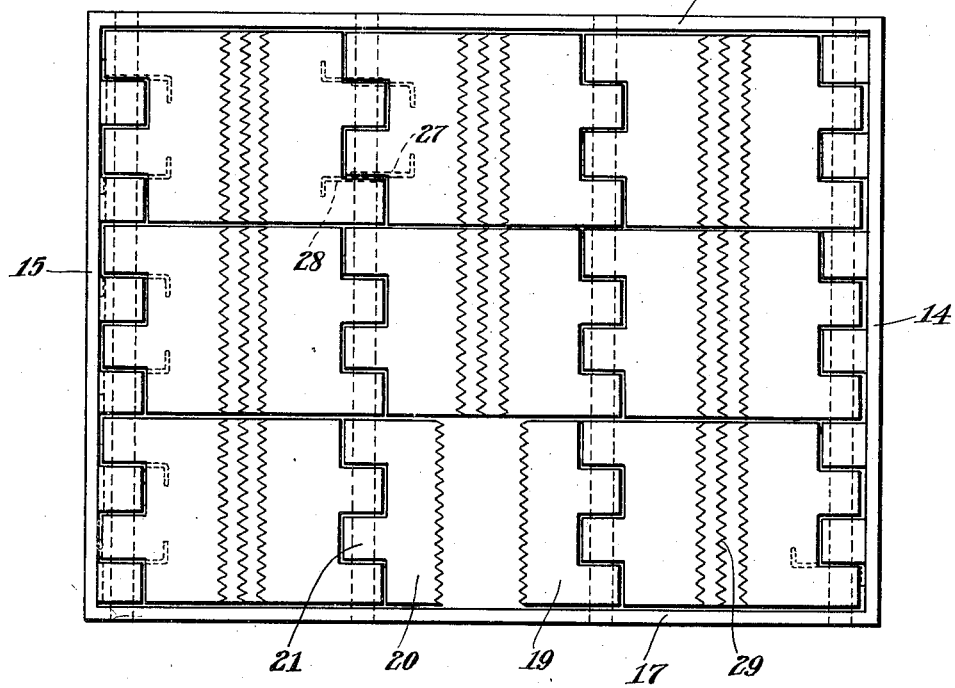
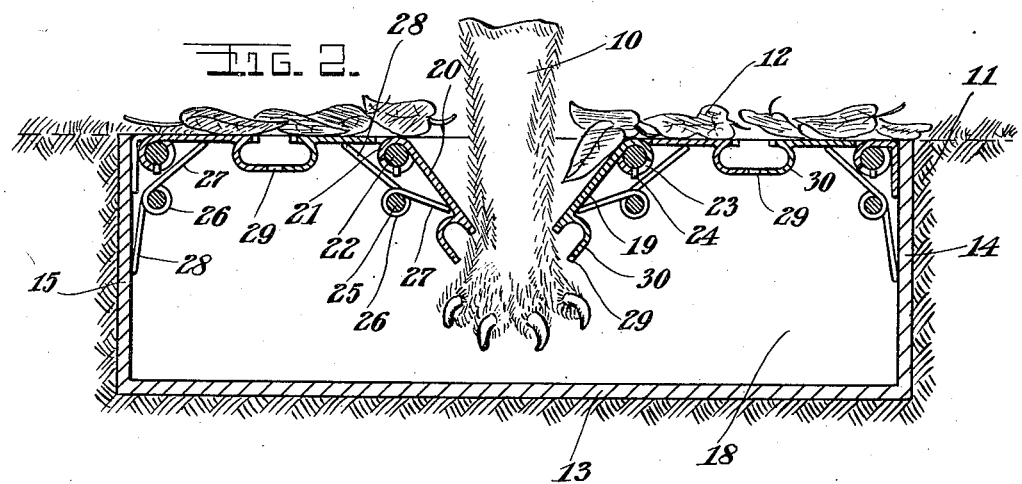
INVENTOR.
J. Oberle
BY
Emil Hauer
ATTORNEY.

Patented July 19, 1938

2,123,955

UNITED STATES PATENT OFFICE 2,123,955

ANIMAL SNARE TRAP

Josef Oberle, New York, N. Y.

Application April 9, 1935, Serial No. 15,383

3 Claims. (Cl. 43—77)

The main object of this invention is to provide a trap which ensnares the feet of an animal and retains the fur or pelt in uninjured and undamaged condition.

Another object of the invention is to provide a trap or snare which may be concealed in a forest under normal conditions by a covering of leaves and may entrap one or more feet of the animal, also catching the mate or additional animals as this snare will be constructed in multiples.

The above and other objects will become apparent in the description below in which characters of reference refer to like-named parts in the drawing.

Referring briefly to the drawing, Figure 1 is a top plan view of the trap.

Figure 2 is a sectional side elevational view of the same, with an animal's foot in captured position.

Referring in detail to the drawing the numeral 10, indicates a fur bearing animal's foot. The feet of the animal are adapted to tread over the trap, which latter is submerged in the soil 11, and is covered in a natural manner by leaves 12, or underbrush. The trap comprises a bottom 13, and side walls 14 and 15, the trap body is completed by the rear wall 16 and the front wall 17. The walls and bottom encompass a chamber 18, which is covered by a plurality of trap doors which operate in pairs. One pair of trap doors includes two members 19 and 20. These trap doors are provided with hinged sleeves 21, and are mounted on spindles 22. The hinged sleeves 21, each have a circular slot 23, in which a pin 24 secured to its respective spindle registers. Beneath spindles 22 are located parallel shafts 25, which are anchored in the front and rear walls 16, 17. Mounted on these shafts 25 are coil springs 26. The ends of these coil springs 26, represented as fingers 27, engage the underside of the trap doors 19 and 20 while the fingers 28, obtain tension by engaging the opposing side walls 14, 15 of the trap. Each of the adjacent edges of the trap doors is provided with a plurality of serrated teeth 29, and the adjacent edges are also formed into a double engaging hook member 30, one beneath the other in the manner shown in Figure 2.

The trap is adapted to snare an animal preferably a fur bearing one by its feet, and as the animal steps upon one of the trap doors of which a plurality are constructed to each trap, the feet depress two of the doors, in struggling to extract one of the feet the animal with its remaining feet will step upon other trap doors and have all of its feet entrapped in the snare. The entrapping of one foot of the animal is accomplished in the manner shown in Figure 2. As the doors 19 and 20, or any set of doors is folded and hingedly moved downward the serrations of teeth 29, will prevent any of the feet of the animal from being extracted from the trap. The slot 23, and pin 24, of each side of trap doors is constructed into the device with a view to preventing the trap doors from rotating above the horizontal line.

It is to be noted that certain changes in form and construction may be made without departing from the spirit and scope of the invention.

I claim:

1. In a trap of the class described a plurality of trap doors, a casing being covered by said doors, spindles hingedly mounting said trap doors, pins on said spindles, said doors having hinged sleeves bounding said spindles, said hinged sleeves having slots therein in which said pins register, said slots and said pins cooperating to permit rotation of said trap doors from a depressed to a horizontal position, shafts mounted in said casing, and coil springs wound about said shafts having the ends thereof engaging opposing trap doors, said springs being adapted to normally retain said trap doors in horizontal position, the cooperating edges of the doors of each pair being provided with sets of serrated teeth to grip the foot of an animal, said sets of teeth on each door being arranged, one above the other, the upper sets of teeth of opposite doors being spaced apart when said trap doors are in closed position, the lower sets of teeth of opposing doors being interengaged when said trap doors are in closed position.

2. In a trap of the class described, a casing set into the earth's surface, a plurality of trap doors extending lengthwise and widthwise of the casing and normally located within the horizontal plane formed by the upper edge of the casing so as to align with the earth's surface, spindles extending crosswise of the casing, said trap doors being rotatably hinged on said spindles, cooperating stop means on said spindles and hinged portions of the trap doors for limiting upward movement of the trap doors into the above mentioned horizontal plane, shafts mounted below and parallel to said spindles, and coil springs mounted upon said shafts, the extended ends of said coil springs engaging adjacent trap doors for normally maintaining the trap doors in their horizontal plane.

3. A trap of the class described comprising a pair of pivoted trap doors which normally maintain a horizontal closed position, the adjacent edges of said trap doors being provided with two sets of serrated teeth for gripping the foot of an animal, said sets of teeth on each door being arranged one above the other, the upper set of teeth lying substantially in the plane of the doors and being spaced apart when said trap doors are closed, and the second set of teeth being located in a plane below the first set of teeth and being interengaged when said trap doors are in said closed position.

JOSEF OBERLE.